US006640660B2

United States Patent
Kasai (10) Patent No.: US 6,640,660 B2
(45) Date of Patent: Nov. 4, 2003

(54) PICK-UP AND PLACEMENT APPARATUS (76) Inventor: Hidehiko Kasai, 251-11, Kurihaba, Nomura, Hirooka, Siojiri-shi, Nagano-ken (JP)

( * ) Notice: Subject to any disclaimer, the term of this patent is extended or adjusted under 35 U.S.C. 154(b) by 0 days.

(21) Appl. No.: 09/739,166

(22) Filed: Dec. 18, 2000

(65) Prior Publication Data

US 2001/0018017 A1 Aug. 30, 2001

(51) Int. Cl.$^7$ ............................................. F16H 21/18
(52) U.S. Cl. ..................... 74/50; 74/25; 74/49; 74/53; 74/490.01; 74/490.05; 74/490.08; 414/729; 414/749.1
(58) Field of Search ................. 414/729, 749.1, 414/751.1; 74/25, 49, 50, 53, 490.01, 490.05, 490.08

(56) References Cited

U.S. PATENT DOCUMENTS

| | | | | |
|---|---|---|---|---|
| 3,954,371 A | * | 5/1976 | Hutt et al. | 425/327 |
| 4,462,741 A | * | 7/1984 | Sogawa et al. | 100/215 |
| 4,627,787 A | * | 12/1986 | Bond et al. | 414/786 |

FOREIGN PATENT DOCUMENTS

| | | | | |
|---|---|---|---|---|
| JP | 359191528 A | * | 10/1984 | ........... B21D/43/02 |
| JP | H05-84619 | | 4/1993 | |
| JP | 05084619 | * | 6/1993 | ........... B23P/19/04 |
| JP | H06-57574 | | 8/1994 | |
| JP | 06-297258 | | 10/1994 | |

* cited by examiner

Primary Examiner—Eileen D. Lillis
Assistant Examiner—Michael Lowe
(74) Attorney, Agent, or Firm—Cook, Alex, McFarron, Manzo, Cummings & Mehler, Ltd.

(57) ABSTRACT

Pick-up and placement apparatus including an arm that executes pick-up and placement motions and an arm drive mechanism. The drive mechanism comprising a driven rotating member having an appointed range of rotation, a swiveling member slidably attached to the rotating member and swiveling in an appointed range of rotation by normal and reverse rotations of the rotating member, a connection portion directly or indirectly linked with the arm, a retaining member applying a retaining force to retain the swiveling member at an appointed position in a radial direction with respect to the rotating member while slidably retaining the swiveling member, and an apparatus regulating and guiding said connection portion to linearly move the connection portion by directly or indirectly regulating the swiveling member in the vicinity of both ends of in the range of rotation.

9 Claims, 7 Drawing Sheets

PICK-UP AND PLACEMENT APPARATUS

FIELD OF THE INVENTION

The present invention relates to a pick-up and placement apparatus, and more particularly to a structure of a preferable transfer mechanism for picking up precious components, etc., and moving the same to other places.

BACKGROUND OF THE INVENTION

Generally speaking, a pick-up and placement apparatus is used for picking up workpieces at a certain place, transferring the same and placing the same at places distant therefrom, and is used to feed various types of components to places where processing and machining are carried out, and remove the same from the processing and machining places. A pick-up and placement apparatus is generally composed of an arm provided with a grasping mechanism, etc., to grasp workpieces and a drive mechanism for reciprocating the arm. The arm is usually driven and reciprocated along an inverted U-shaped motion locus by the drive mechanism. Therefore, the drive mechanism is provided with a drive source such as a drive motor, etc., which actuates the arm portion, and a motion converting portion which transmits power from the drive source to the arm and simultaneously provides the arm with a desired motion.

Apparatuses described in Japanese Patent Publication No. 57240 of 1982 and Japanese Utility Model Publication No. 126522 of 1991 have been brought about as a pick-up and placement apparatus having this type of structure. The abovementioned motion converting portion described in these publications is provided with, for example, a swiveling member which can normally and reversely be turned by a drive motor, a driven member (cam follower) slidably attached to the tip end of the swiveling member in the radial direction, an inverted U-shaped cam groove which guides the corresponding driven member, and a transmitting member such as a transmission lever, gear, etc., which is connected between the driven member and the abovementioned arm as necessary. When the swiveling member swivels, the driven member slides and reciprocates along the cam groove, and the arm is operated in response to a sliding locus of the driven member.

However, in the prior art pick-up and placement apparatus, in order to achieve the abovementioned motions of the arm, the driven member attached to the swiveling member is devised so as to be guided by, for example, an inverted U-shaped cam groove. Therefore, large and excessive loads are given to the drive source due to the sliding resistance and vibration of the swiveling member, driven member and cam groove, and there is a problem when an attempt is made to accelerate the reciprocation speed of the arm.

In particular, since a general cam is composed of, for example, a horizontal portion linearly extending in the left and right direction, an elevating portion linearly extending in the vertical direction, which is disposed at both sides of the moving extent, and a curved portion having a small curvature radius and arcuately extending between the horizontal portion and the elevating portion, a large stress is applied from the cam groove to the swiveling member and driven member at the curved portion provided with a small curvature radius, and thereby causes such a problem that a load applied to the drive source and a drive loss are increased. The drive load and the degree of drive loss are remarkably increased in proportion to a square or a cube of the moving speed of the driven member, which increases in line with an increase in the arm speed.

Also, since the arm is moved in compliance with the driven member that reciprocates along the cam groove as described above, it is necessary to change the shape of the cam groove in order to alter the motion locus of the arm. Therefore, there is another problem in that it is difficult to change the motion locus of the arm.

SUMMARY OF THE INVENTION

It is therefore an object of the invention to provide a pick-up and placement apparatus equipped with a novel structure, in which stress is hardly generated when the apparatus operates, and loads applied to the drive source thereof can be reduced.

Further, it is another object of the invention to provide a pick-up and placement apparatus which can increase the speed of motion in the arm.

It is still another object of the invention to provide a pick-up placement apparatus in which the motion locus of the arm portion can be easily changed.

A pick-up and placement apparatus according to the invention has an arm that executes pick-up and placement motions and a drive mechanism that drives the corresponding arm. The corresponding drive mechanism comprises a rotating member that is normally or reversely driven and rotated in an appointed range of rotation, for example by a drive source, a swiveling member that is slidably attached to the corresponding rotating member in the radial direction and normally or reversely swivels in an appointed range of rotation by normal and reverse rotations of the corresponding rotating member, and is provided with a connection portion directly or indirectly linked with the corresponding arm, a retaining means that applies a retaining force to retain the corresponding swiveling member at an appointed position in the radial direction with respect to the corresponding rotating member while slidably retaining the corresponding swiveling member, and a means for regulating and guiding the corresponding connection portion to linearly move the same by directly or indirectly regulating the corresponding swiveling member in the vicinity of both ends in the corresponding range of rotation. The corresponding connection portion is constructed so as to reciprocate on a motion locus consisting of an arcuate locus portion, which is composed by the swiveling of the corresponding swiveling member without being substantially regulated, and a linear locus portion connected to both ends of the corresponding arcuate locus portion and composed by being regulated by the corresponding regulating and guiding means. The corresponding arm carries out motions substantially corresponding to the motion locus of the connection portion.

Since the swiveling member slidably attached to the rotating member swivels while it is retained by the retaining means at an appointed position in the radial direction in a state where it is not substantially regulated, the connection portion moves in a circular arc (that is, along the arcuate locus portion), and when the swiveling member is regulated by the regulating and guiding means in the vicinity of both ends of the range of rotation, the connection portion linearly moves (that is, along the linear locus portion). Resultantly, since the connection portion will reciprocate along an inverted U-shaped locus of movement, the arm will also reciprocate like an inverted U-shape. Therefore, the swiveling member is not substantially regulated other than being restricted by the regulating and guiding means in the vicinity of both ends of the range of rotation, and can freely swivel while maintaining a swiveling radius by the retaining means, wherein there is no case where the swiveling member is always regulated by a cam groove, etc., as in the prior arts. Therefore, the drive load and vibration resulting from regulation of the locus can be reduced. Resultantly, it becomes possible to operate the arm at a high speed. Further, since the locus of movement of the connection portion is composed by connecting the arcuate locus portion and linear locus portion to each other, the connection angle at the corresponding portion can be slackened, and it is possible to suppress or prevent the swiveling member from receiving an impact or generating vibration at the regulation commencing position by the regulating and guiding means. Further, there is no need to constitute an integrated regulating and guide member like a cam groove, and the inverted U-shaped motion locus of the arm are enabled by only providing a regulating and guiding means at both ends of the range of rotation. Therefore, it is possible to simply change the motions of the arm in a wider range by only changing the regulating and guiding position by the regulating and guiding means.

In the abovementioned invention, it is preferable that the retaining means is constructed so as to maintain the abovementioned swiveling member in an appointed position of the maximum swiveling radius in a state where the abovementioned swiveling member does not receive any other regulation, and the regulating and guiding means regulates the swiveling member from the outside of the locus of movement and so as to partially reduce the swiveling radius.

In the invention, it is preferable that, in a state where the abovementioned swiveling member does not receive any regulation, the retaining means is constructed so as to maintain the swiveling member in an appointed position of the minimum swiveling radius, and the regulating and guiding means regulates the swiveling member from the inside of the locus of movement and is constructed so as to partially increase the swiveling radius.

In addition, in the invention, it is preferable that, in a state where the swiveling member does not receive any regulation, the retaining means is constructed so as to maintain the swiveling member at an intermediate position of the slidable range, and the regulating and guiding means regulates the swiveling member from the inside of the locus of movement at a part of the linear locus portions to increase the swiveling radius, and regulates the swiveling member from the outside of the locus of movement in other part of the linear locus portions to reduce the swiveling radius.

In the invention, it is preferable that the retaining means include a resilient member that maintains the position of the swiveling member in the radial direction by a resilient force.

In the invention, it is preferable that the retaining means is provided with a limiting means for determining the limit position of the swiveling member at one side, and a pressing means for pressing the swiveling member toward the abovementioned side. As the limiting means, there is a means having an engagement structure which is engaged at an appointed position in order to regulate a sliding motion of the swiveling member. Also, the pressing member presses the swiveling member to the limiting position which is regulated by the limiting means. For example, there is a resilient member such as a coil spring, etc., or a compression device such as an air cylinder, etc. As a detailed example in this case, a mechanism can be considered, in which the limiting means is constructed so as to limit the maximum swiveling radius of the swiveling means, and the pressing means presses the swiveling member toward the side of the radial direction with respect to the rotating member. In this mechanism, if a resilient member such as a coil spring is used as the pressing means, it is preferable that such a structure is employed in which a compressed resilient member is accommodated between the rotating member and swiveling member, and the limiting means directly or indirectly (for example, via a limiting member) engages the rotating member with the swiveling member, wherein the sliding of the swiveling member is prohibited such that the swiveling radius does not further increase in the engaged state.

In addition, it is preferable that the respective inventions are constructed so as to have a driven member rotatably connected to the connection portion of the swiveling member, for example, a roller (a guide roller 17, etc., described later) and a ring member (for example, an engagement ring 25, etc., described later), and the corresponding driven member is engaged (followed) with the regulating and guiding means to regulate the swiveling member.

Also, in the invention, it is preferable that the swiveling member is rotatably connected to the arm at the connection portion and is provided with a guide supporting means comprising a first guide member to slidably guide the arm in the extending direction of a pair of the linear locus portions connected to both ends of the arcuate locus portion, and a second guide member to guide the abovementioned first guide member movably constructed in the direction of a line that connects one of the linear locus portions with the other of the linear portions. In this case, it is preferable that the regulating and guiding means is constructed so that the swiveling member can move along the locus of movement by regulating the first guide member or the arm.

Further, the invention is provided with a guiding and supporting means, which guides and supports the arm so that it always extends in the same direction from the connection portion, wherein the regulating and guiding means regulates the arm or the guiding and supporting means, and then the connection portion is moved along the locus of movement by the regulation.

Also, although the respective inventions are constructed so that the extending direction at the linear locus portion of the locus of movement has an angle less than 90 degrees with respect to the tangential direction at the end portion of the arcuate locus portion, it is preferable that the angle is between 0 and 40 degrees, and in particular it is preferable that the angle is between 0 and 30 degrees. Especially, it is most preferable that the angle is almost zero, that is, the linear locus portion extends in roughly a direction tangential to the end position of the abovementioned arcuate locus portion. If so, it is possible to decrease the impact and load stress fluctuation that the swiveling member receives when regulation is commenced by the regulating and guiding means.

Further, in the respective inventions, it is preferable that the linear locus portion of the locus of movement is set to be parallel to the tangential line at one point on an extended circular arc of the arcuate locus portion and has an equal locus length at both sides of the point. That is, the abovementioned linear locus portion is formed at one point in parallel to the tangential line and is constructed so that the straight line extending from the above point to the center of swivel becomes perpendicular bisector of the linear locus portion. If so, since the amount of fluctuation in the swiveling radius of the swiveling member due to regulation of the regulating and guide member can be reduced and it is possible to secure a sufficient length of the linear locus portion, the drive load can be decreased, and at the same time noise and vibration can be lowered.

Still further, in the respective inventions, a means having a regulating and guiding plane by which the swivel member is regulated in the direction that increases a swiveling radius, a means having a regulating and guiding plane by which the swivel member is regulated in the direction of decreasing a swiveling radius, and a means having a pair of regulating and guiding planes by which the swivel member is regulated in both the increasing and decreasing directions may be listed as the abovementioned regulating and guiding means. In this case, such a structure, which has a pair of regulating and guiding planes by which the swiveling member is regulated in both the directions of increasing and decreasing an swiveling radius, can be constructed by a groove-shaped member.

In the respective invention, it is preferable that the respective regulating and guiding planes are made flat.

DETAILED DESCRIPTION OF THE INVENTION

Figure 2:
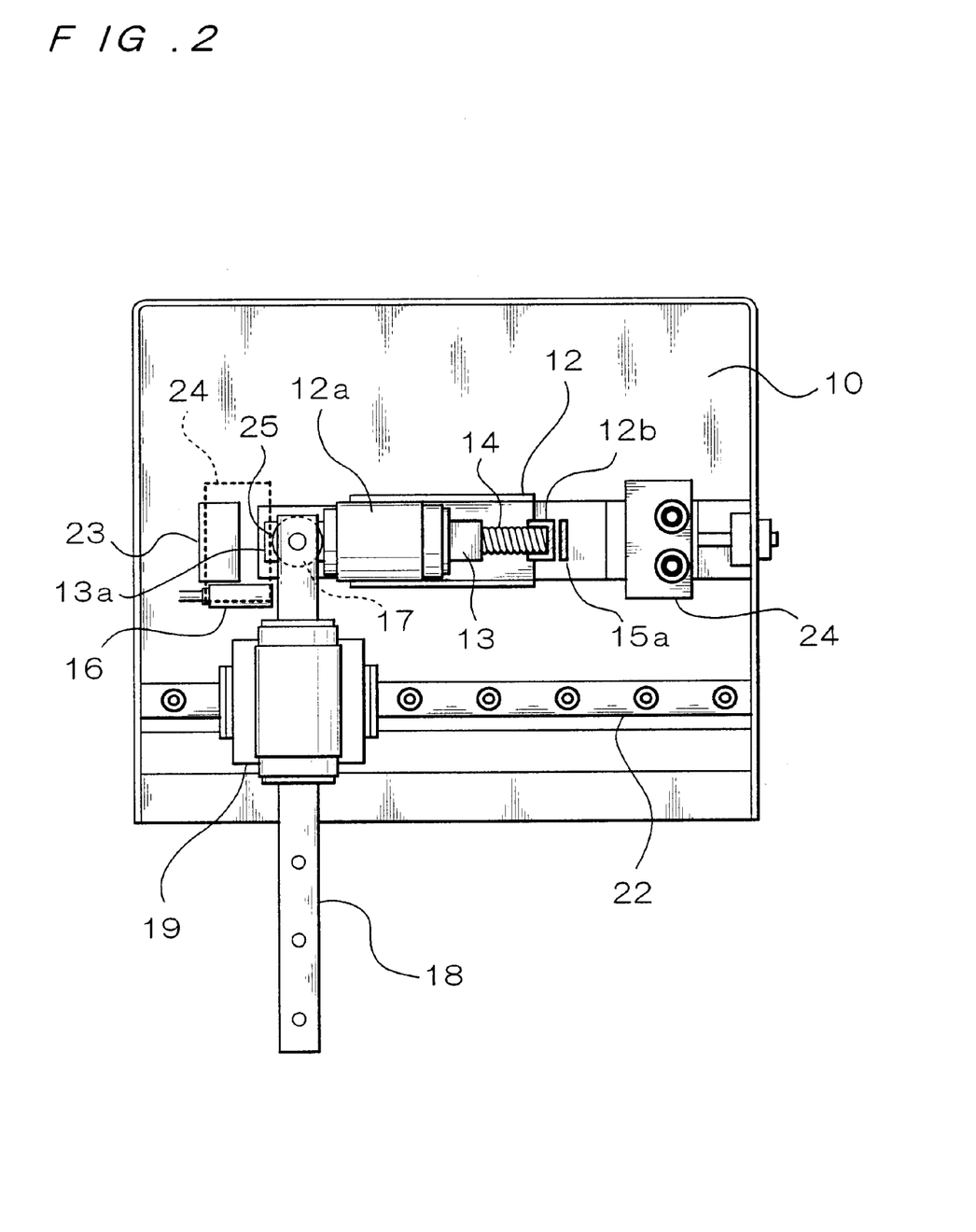
FIG. 2 is a longitudinal-sectional view showing the same embodiment from the front side thereof.
Figure 3:
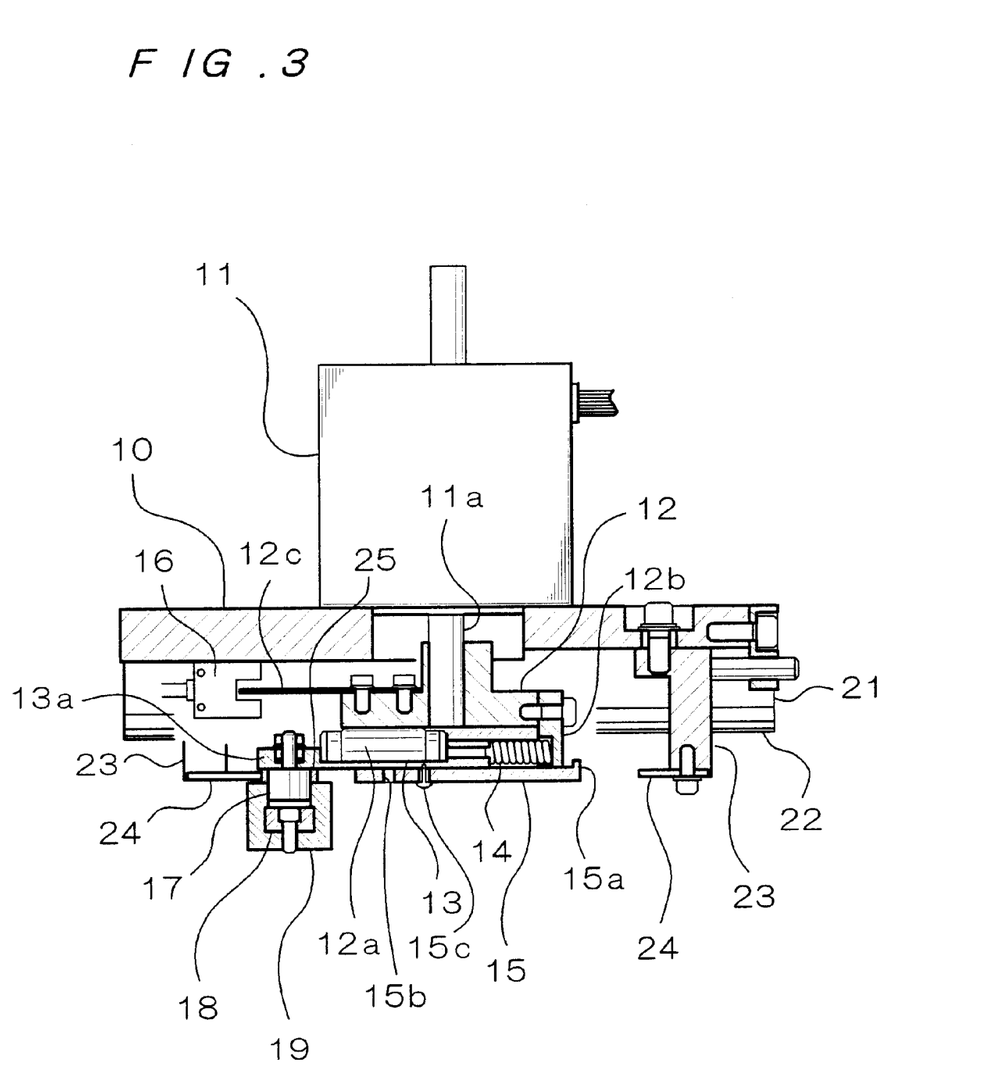
FIG. 3 is a cross-sectional view showing the same embodiment from upward thereof.
Figure 4:
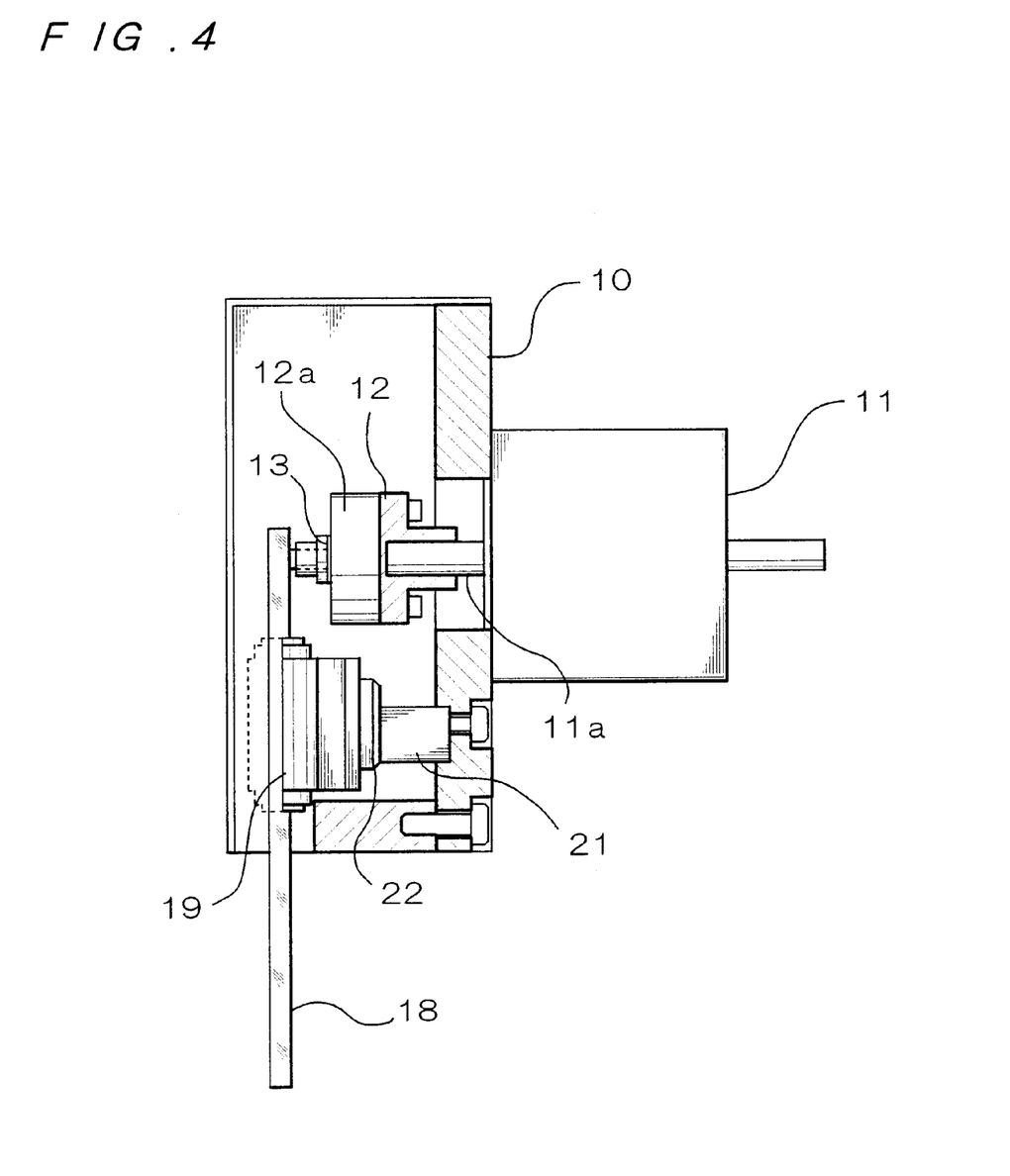
FIG. 4 is a longitudinal-sectional view showing the same embodiment from the side thereof.

Next, a detailed description is given of embodiments of a pick-up and placement apparatus according to the invention with reference to the accompanying drawings. FIG. 2 is a longitudinal-sectional view showing the major parts of the same embodiment from the front side thereof, FIG. 3 is a cross-sectional view showing the same major parts from above, and FIG. 4 is a longitudinal-sectional view showing the same major parts from the side thereof. In any one of the drawings, the major parts are illustrated, omitting some members or a part thereof located at front side of the drawing.

A drive motor 11 is attached to a supporting frame 10 from the back side. The output shaft 11a of the drive motor 11 is fixed at a rotating support base 12. The swiveling member 13 is attached to the rotating support base 12 via a bearing 12a. The swiveling member 13 is slidably guided linearly in the direction of swiveling radius of rotation (hereinafter merely called "radial direction"). A resilient member 14 such as a coil spring is accommodated between the swiveling member 13 and the stopper 12b fixed at the rotating support base 12, and the swiveling member 13 is pressed by the resilient members 14 toward the radial direction. A limiting member 15 is fixed at the swiveling member 13. An engaging portion 15a is provided at the distal end of the limiting member 15, and it is constructed that, when the swiveling member 13 slides in the direction that increases a swiveling radius of the connection portion 13a of the swiveling member 13, the slide range of the swiveling member 13 is limited by engagement of the engaging portion 15a with the stopper 12b.

As shown in FIG. 3, a detection plate 12c consisting of a slit plate, etc., is attached to the rotating support base 12, and the rotating status of the rotating support base 12 can be detected by detecting passage of the detecting plate 12c by a detector 16 consisting of an optical sensor, etc., wherein the drive motor 11 is controlled by a control device (not illustrated), using outputs of the detector 16 as feedback signals.

The distal end of the swiveling member 13 is made into a connection portion 13a rotatably attached to the arm via a pin to which a guide roller 17 is rotatably attached. The arm 18 is slidably attached in the vertical direction with respect to a guide member 19. A guide rail 22 extending in the horizontal direction is fixed at the supporting frame 10 via an attaching frame 21, wherein the guide member 19 slidably attached in the horizontal direction with respect to the guide rail 22. A fitting ring 25 is attached to the outer circumferential surface of the guide roller 17.

In addition, a pair of regulation plates 24 are fixed at the supporting frame 10 via a pair of left and right attaching bases 23. The regulation plate 24 is disposed at both the left and right sides of the rotating support base 12. The regulation plates 24 is brought into contact with the fitting ring 25 attached to the outer circumferential surface of the guide roller 17 from the outside of the swivel locus of the swiveling member 13 and causes the swiveling member 13 to move toward the center of the swiveling motion, wherein the rotation radius of the connection portion 13a of the swiveling member 13 is regulated so as to decrease.

Further, the embodiment is constructed so that the attaching and fixing position of the limiting member 15 with respect to the swiveling member 13 can be varied. As shown in, for example, FIG. 3, in the case where the limiting member 15 is secured at the swiveling member 13 by a screw 15c, screw holes 15b are provided in the limiting member 15 at two more different places in order to screw and fix the limiting member 15 as a structure for varying the attaching and fixing position of the limiting member 15. By providing such a structure to vary the attaching and fixing position of the limiting member 15 and changing the position with respect to the swiveling member 13, the positional relationship between the engaging portion 15a and the stopper 12b may change, whereby it is possible to vary the swiveling radius of the swiveling member 13. By changing the swiveling radius, the moving stroke of the arm 18 in the vertical direction can be changed.

Also, the left and right regulation plates 24 are constructed so that the positions thereof can be changed in the left and right direction illustrated in the drawing (that is, in the direction of changing the distance from the swiveling center) by changing the position of the attaching base 23 with respect to the supporting frame 10. With the structure, it is possible to simply change the pick-up position and placement position of the arm 18.

Next, a description is given of actions of the embodiment described above. The drive motor 11 operates so that the output shaft 11a thereof rotates normally or reversely within an appointed range of rotation, and the rotating support base 12 rotates in line with the rotation of the output shaft 11a.

The detection plate 12c also rotates due to the rotation of the rotating support base 12, wherein when the detector 16 detects that the detection plate 12c has reached an appointed position, and the drive motor 11 causes the output shaft 11a to turn reversely. By repeating the actions, the rotating support base 12 repeatedly rotates in a normal or reverse direction, wherein the connection portion 13a of the swiveling member 13 reciprocates due to the rotations of the base 12 along an inverted U-shaped locus of movement as shown by the arrow in FIG. 1.

Figure 1:
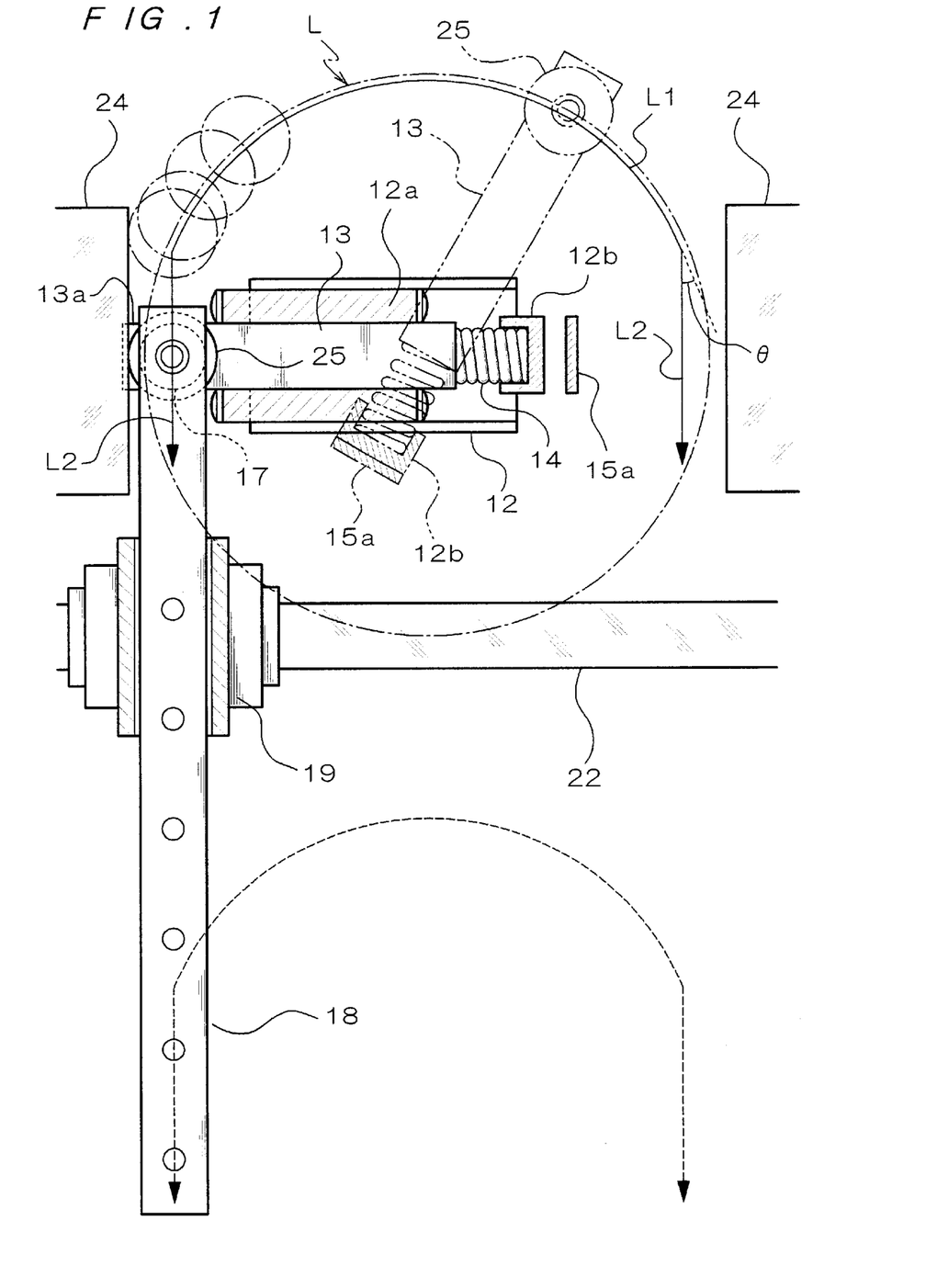
FIG. 1 is an enlarged view explaining a structure and actions of the major parts in a preferred embodiment of a pick-up and placement apparatus according to the invention.

At this time, as shown by the one-dotted line in FIG. 1, in a state where the swiveling member 13 is not brought into contact with the regulation plate 24, the engagement portion 15a of the limiting member 15 is retained to be engaged with the stopper 12b so that the swiveling radius of the swiveling member 13, that is, the radius of the moving radius of the connection portion 13a of the swiveling member 13 is maximized. In this state, the guide roller 17 and fitting ring 25 arcuately move in line with rotation of the rotating support base 12. As the connection portion 13a of the swiveling member 13 accesses the end of the arcuate locus portion L1 in locus of the motion L of the connection portion 13a indicated by the arrow and one-dotted line in FIG. 1, the fitting ring 25 is brought into contact with the side of the regulation plate 24, and the swiveling member 13 still rotates while pressing and contracting the resilient member 14. At this time, the guide roller 17 connected to the connection portion 13a of the swiveling member 13 moves down linearly as shown by the arrow in the drawing. When the connection portion 13a of the swiveling member 13 moves to the end of the linear locus portion L2, the drive motor 11 reversely rotates, and the swiveling member 13 commences rotation in the reverse direction. At this time, since the fitting ring 25 is still in contact with the regulation plate 24, the guide roller 17 is linearly elevated. And then, when the fitting ring 25 is soon separated from the regulation plate 24 after the connection portion 13a of the swiveling member 13 is gradually caused to extend outside the locus of movement, the guide roller 17 commences arcuate swiveling at a characteristic swiveling radius.

As the swiveling member 13 repeats such a motion, the arm 18 rotatably attached to the connection portion 13a of the swiveling member 13 moves vertically and laterally (left and right) while the vertical state of the arm 18 is kept by the guide member 19. At this time, the locus of movement of the lower end portion (a portion to which a manipulator is connected) of the arm 18 also becomes an inverted U-shape in which an arcuate portion and a linear portion are connected as shown by the dotted arrow in FIG. 1.

In the embodiment, the connection portion 13a of the swiveling portion 13 rotates so as to take an arcuate locus portion L1 as described above, and the fitting ring 25 is brought into contact with the regulation plate 24 at only both ends of the range of rotation, wherein the connection portion 13a of the swiveling member 13 is caused to move linearly along the side of the regulation plate 24 while the regulation plate 24 presses the swiveling member 13 retained by the resilient member 14 toward the swivel center side. Thereby, it is not necessary to use an inverted U-shaped cam groove as in the prior arts, and it is possible to construct the folding and bending angle θ between the arcuate locus portion L1 and linear locus portion L2 of the locus of movement L of the connection portion 13a so as to be small. Therefore, the load stress to the swiveling member 13 when driven can be reduced, and at the same time, vibration of the fitting ring 25 secured at the connection portion 13a of the swiveling member 13 can be suppressed. Accordingly, the arm 18 can be operated at a high speed.

Figure 5:
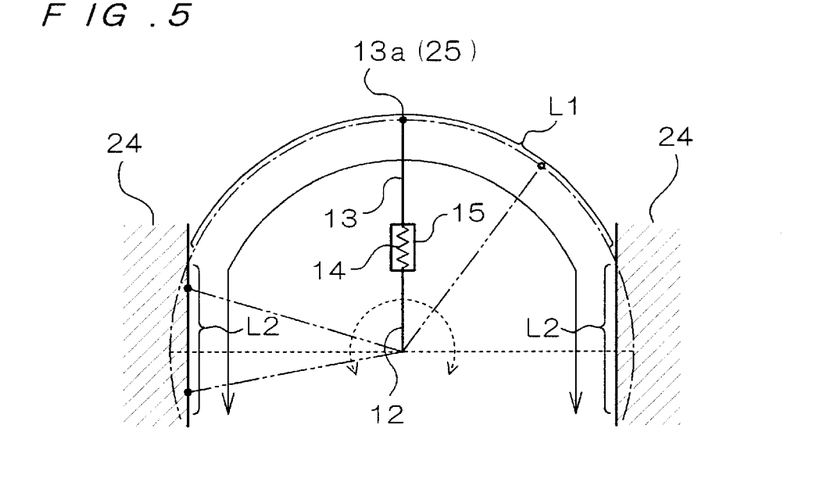
FIG. 5 is a view showing the conceptual structure of the same embodiment.

FIG. 5 is a conceptual view showing the basic construction of the embodiment. When the rotating supporting base 12 rotates, the swiveling member 13 arcuately swivels by means of the resilient member 14 and limiting member 15 at the central portion of the range of rotation in a state where the swiveling member 13 is retained at an appointed swiveling radius (maximum swiveling radius). At this time, the rotating support base 12 and swiveling member 13 can freely rotate without their movement being regulated by the regulation plate 24, etc. Therefore, the drive load of the drive motor being the drive source can be reduced, and the pick-up and placement motion can be easily accelerated.

On the other hand, in the vicinity of both ends in the range of rotation of the rotating supporting base 12, that is, in the vicinity of both ends of the range of rotation of the swiveling member 13, the fitting ring 25 treads a linear locus portion L2 by the fitting ring 25 being regulated by the side of the regulating plate 24. Since the linear locus portion L2 is connected to the arcuate locus portion L1 at a shallow angle, impact can be reduced when the fitting ring 25 is brought into contact with the regulation plate 24, and at the same time, it is possible to secure a considerably long linear locus portion L2 by only slightly reducing the swiveling radius of the swiveling member 13 at the linear locus portion L2 of the locus of movement. At the linear locus portion L2 of the locus of movement, the swiveling member 13 is in a state where the stress received by the side of the regulation plate 24 and the resilient force of the resilient member 14 corresponding thereto are well balanced, and the fitting ring 25 moves vertically in a state where the fitting ring 25 is pressed to the regulation plate 24.

In the embodiment, since the movement of the swiveling member 13 in a direction that increases the swiveling radius is limited, the connection portion 13a of the swiveling member 13 is retained by the resilient member 14 at a position having the maximum swiveling radius, which is determined by the limiting action. Therefore, even though the swiveling cycle of the swiveling member 13 is changed, the swiveling radius hardly changes due to a change in the centrifugal force applied to the swiveling member 13 whereby the reciprocating and rotating motion of the swiveling member 13 can be stabilized.

Also, in this case, it is preferable that the linear locus portion L2 of the abovementioned locus of movement L is formed in parallel to a tangential line at an appointed position of a circle formed by expanding the arcuate locus portion L1 shown by a one-dotted line in the drawing, and a line perpendicular to the above tangential line at an appointed position on the abovementioned circle becomes perpendicular bisector of the linear locus portion L2. Thus, it is possible to reduce the amount of slide of the swiveling member 13 by the regulation plate 24 while securing a length of the linear locus portion L2 of the locus of movement L. In other words, it is possible to increase the length of the linear locus portion L2 while suppressing the amount of slide (the moving distance in the radial direction) of the swiveling member 13.

Figure 6:
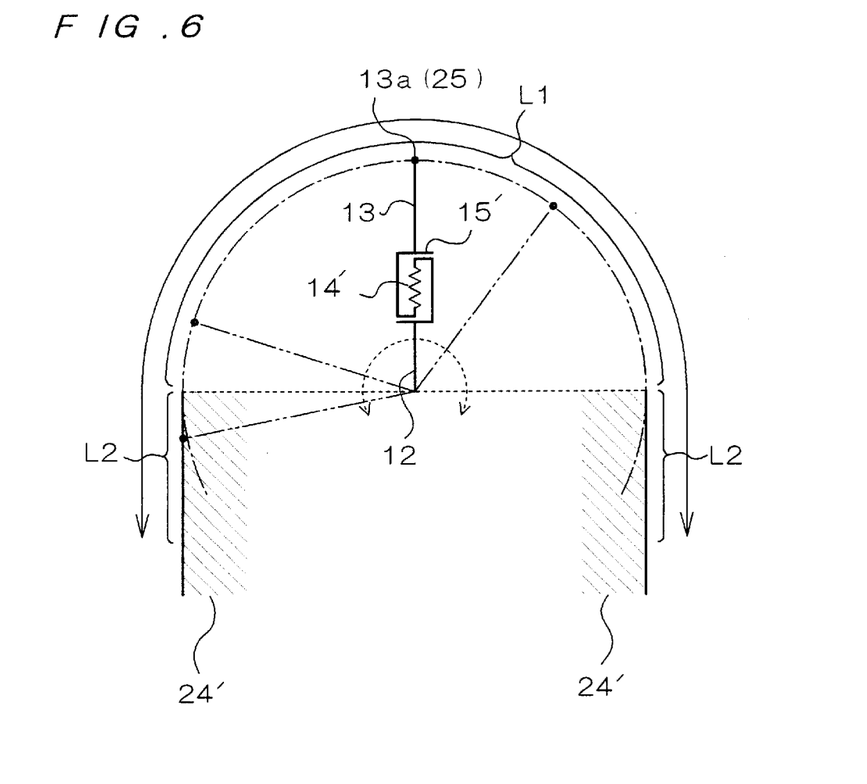
FIG. 6 is a view showing the conceptual structure of a modified version of the same embodiment.

FIG. 6 is a conceptual view showing a modified version of the abovementioned embodiment. In the modified version, the swiveling member 13 is connected to the rotating support base 12 via the resilient member 14, and the modified version is provided with a construction which is similar to the abovementioned embodiment in that the connection portion 13a connected with a guide roller 17 and a fitting ring 25, wherein the swiveling member 13 is constructed so as to be slidable with respect to the rotating support base 12 so that the swiveling radius of the swiveling member 13 may increase or decrease. However, in the modified version, the limiting member 15' is constructed so as to determine the lower limit of the swiveling radius of the connection portion 13a of the swiveling member 13. And, when the connection portion 13a of the swiveling member 13 is located on the arcuate locus portion L1 of the locus of movement, the resilient member 14' retains the swiveling member 13 so that it maintains its minimum swiveling radius. That is, the resilient member 14' is constructed so as to attract the swiveling member 13 to the swiveling center side. In the modified version, the regulation plate 24' is disposed so that the regulation plane is located at both ends of the arcuate locus portion L1 in the locus of movement of the connection portion 13a of the swiveling member 13. The regulation plate 24' is constructed so that it is brought into contact with the fitting ring 25 from the inside of the locus of movement.

Also, the illustrated resilient member 14' is attached in a compressed state, wherein the resilient member 14' is connected so that the rotating support base 12 and the swiveling member 13 are attracted to each other by elongation of the resilient member 14'. However, on the contrary, it may be acceptable that, when the resilient member 14' is connected between the rotating support base 12 and the swiveling member 13 in an elongated state, the resilient member 14' is constructed so as to attract both of them to each other by the contraction thereof.

In the modified version, as the connection portion 13a of the swiveling member 13 reaches both ends of the arcuate locus portion L1 of the locus of movement, the regulation plate 24' is brought into contact with the fitting ring 25 from the inside of the locus of movement and regulate the swiveling member 13 so that the swiveling radius of the connection portion is increased. Therefore, although the connection portion 13a of the swiveling member 13 swivels at the minimum swiveling radius at the arcuate locus portion L1 of the locus of movement, the connection portion 13a is gradually pushed out by the regulation plate 24'. On the contrary, the resilient member 14' attracts the connection portion 13a of the swiveling member 13 to the swiveling center side against a pressing force that the connection portion 13a receives by the regulation plate 24', wherein the linear locus of movement can be stabilized.

Also, in the modified version, since the connection portion 13a freely rotates and swivels where it is located on the arcuate locus portion L1 of the locus of movement, the drive load of the rotating support base 12 and swiveling member 13 is slight. In addition, in the modified version, the regulation guiding plane of the regulation plate 24' is formed so as to extend along the tangential line at the end of the arcuate locus portion L1 in the locus of movement of the connection portion 13a of the swiveling member 13. Resultantly, the linear locus portion L2 in the locus of movement is made coincident with the tangential line at the end of the arcuate locus portion L1. Therefore, when the connection portion 13a of the swiveling member 13 passes through the point of connection between the arcuate locus portion L1 and linear locus portion L2, that is, when it is brought into contact with the regulation plate 24' and is separated from the regulation plate 24', it is possible to reduce the impact and/or vibration that the mechanism receives.

Figure 7:
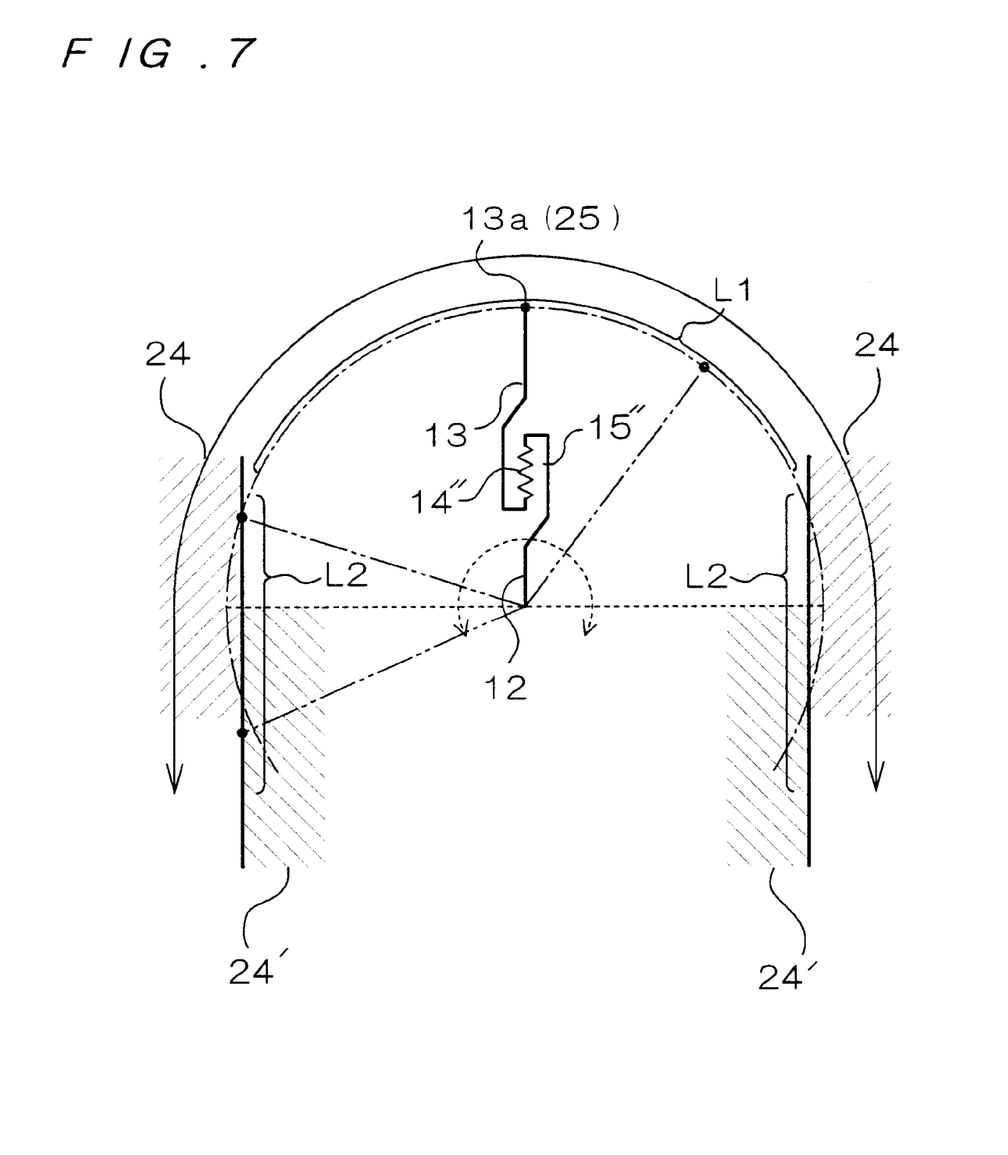
FIG. 7 is a view showing the conceptual structure of another modified version of the same embodiment.

FIG. 7 is a conceptual view showing another modified version. In this modified version, although a resilient member 14" similar to that of the abovementioned version is disposed between the rotating support base 12 and swiveling member 13, this modified version differs from the abovementioned respective examples in that, in a state where the swiveling member 13 is not regulated by the regulation plate, etc., that is, the connection portion 13a of the swiveling portion 13 is moving on the arcuate locus portion L1 of the locus of movement, the swiveling member 13 is not particularly subjected to any rigid limitation with respect to the swiveling radius. In this case, where the connection portion 13a is moving on the arcuate locus portion L1 of the moving focus, the swiveling radius of the swiveling member 13 does not correspond to either the maximum value or the minimum value, and the swiveling member 13 is retained at a half position in the range of slide. Also, there is no problem if a limiting member such as, for example, the limiting members 15 and 15', which limits at least one of the maximum value and minimum value of the swiveling radius may be provided unless the limiting member hinders movement along the locus of movement described later in the modified version.

On the other hand, at both end positions of the arcuate portion L1 in the locus of movement of the connection portion 13a of the swiveling member 13 are provided both a regulation plate 24 that is brought into contact with the fitting ring 25 from the outside of the arcuate locus portion L1 as in the abovementioned embodiment and regulates the locus, and a regulation plate 24' that is brought into contact with the fitting ring 25 from the inside of the arcuate locus portion L1 as in the abovementioned modified version and regulates the locus. Therefore, when the fitting ring 25 secured at the connection portion 13a is introduced from the arcuate locus portion L1 in the locus of movement into the linear locus portion L2 therein, the fitting ring 25 linearly moves while being regulated by the regulation plate 24 from the outside (in a direction downward in the illustrated case), and when the connection portion 13a comes outside the swiveling radius of the arcuate locus portion L1 in the locus of movement, the fitting ring 25 is regulated by the regulation plate 24' from the inside. Therefore, it is possible to secure a sufficient length of the linear locus portion L2 in the locus of movement of the connection portion 13a.

In this modified version, it is preferable that the linear locus portion L2 in the locus of movement of the connection portion 13a regulated by the regulation plates 24 and 24' is formed in parallel to the tangential line at an appointed position of a circle formed by extending the arcuate locus portion L1 shown by a one-dotted line in the drawing, and a line perpendicular to the tangential line at above appointed position on the abovementioned circle becomes perpendicular bisector of the linear locus portion L2. Thus, the amount of slide of the swiveling member 13 by the regulation plate 24 can be reduced while securing the length of the linear locus portion L2.

Figure 8:
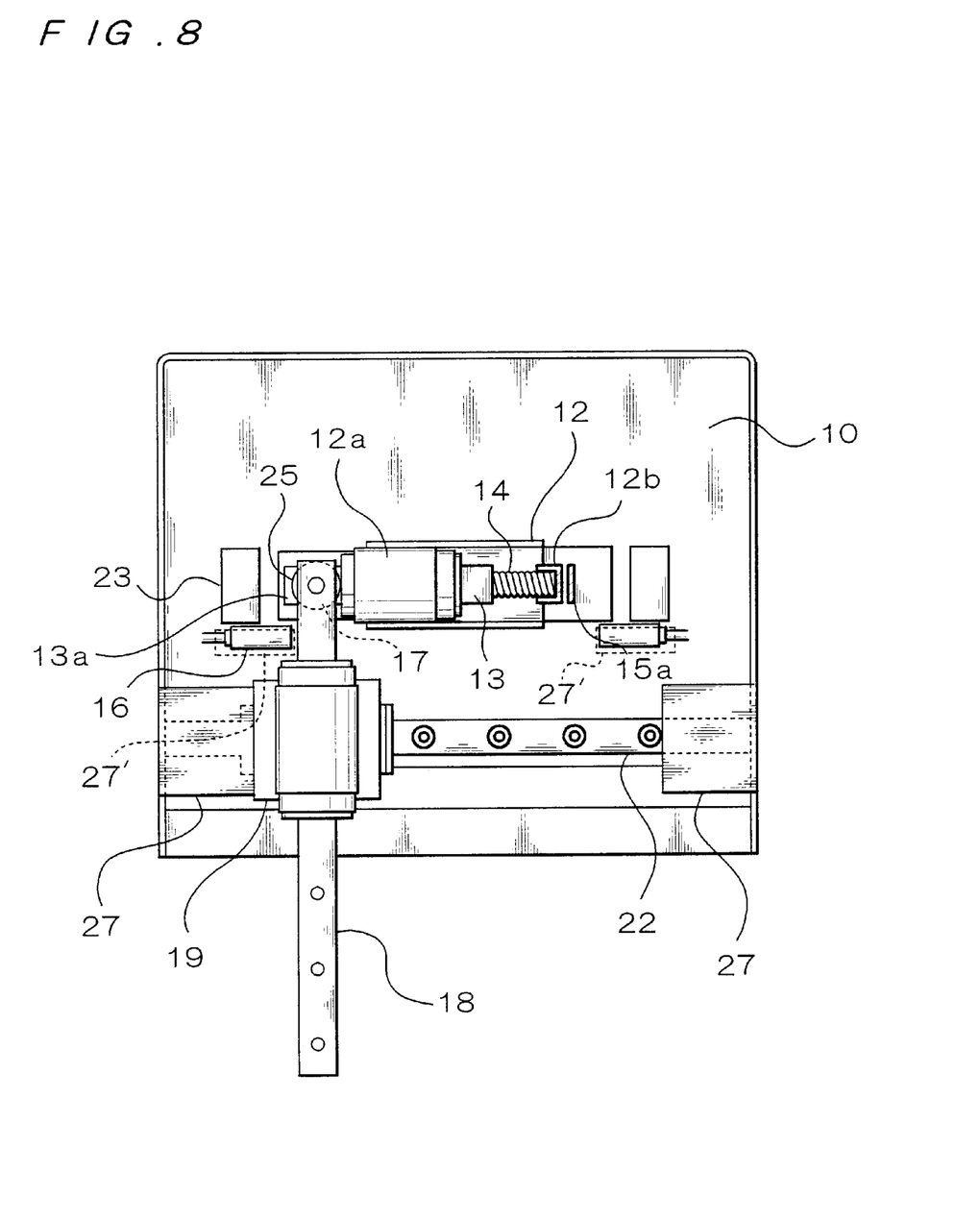
FIG. 8 is a longitudinal-sectional view showing a rough structure of another embodiment according to the invention from the front side thereof.

Finally, a description is given of another embodiment pertaining to the invention with reference to FIG. 8. In the embodiment, a pair of regulation plates 27 that regulate the range of reciprocation in the illustrated left and right direction of a guide member 19 are provided instead of employing the regulation plate 24 in the embodiment illustrated in FIG. 2. The rest of the construction is similar to that of the first embodiment shown in FIG. 2, and overlapping description thereof is omitted. In this embodiment, the guide member 19 moves left and right along with the arm 18 moving in compliance with the swiveling motion of the swiveling member 13, wherein the guide member 19 is brought into contact with the regulation plate 27 in the vicinity of the left and right ends of the left and right reciprocation motion of the guide member 19. Since the guide member 19 supports the arm 18 so that the arm 18 is retained in a state elongated in the vertical direction in the drawing (in a vertically erect state), the swiveling member 13 connected to the guide member 19 via the arm 18 is regulated in the left and right direction if the movement of the guide member 19 in the left and right direction is regulated. Resultantly, the connection portion 13a of the swiveling member 13 treads the locus of movement as that of the embodiment illustrated in FIG. 2.

Although the embodiment is constructed so that the regulation member 27 is brought into contact with the guide member 19 and carries out regulation, the guide member 19 and regulation member 27 do not create any friction since the guide member 19 is constructed so as to move in only the illustrated left and right direction, whereby there is almost no fear that the fitting surface of both the guide member 19 and the regulation member 27 wear, and the amount of noise generated can be reduced. In addition, by adequately selecting the materials of the guide member 19 and regulation member 27, it is also possible to suppress the noise due to the fitting between the guide member 19 and regulation member 27. In this case, it is possible to select materials almost without taking the wear resistance property thereof into consideration.

Further, instead of construction so that the regulation member 27 is brought into contact with the guide member 19 as described above, it is possible to carry out regulation by directly bringing the regulation member 27' into contact with the arm 18. In this case, the fitting position of the regulation member 27' with respect to the arm 18 may be downward of the guide member 19 or upward thereof in the drawing. However, in view of lowering the rotation moment that the guide member 19 receives from the arm 18, it is highly recommended that the fitting position of the regulation member 27' with respect to the arm 18 is upward of the guide member 19 in the drawing, that is, an intermediate position between one portion of the arm 18, which is supported by the guide member 19, and other portion of the arm 18, which is connected to the swiveling member 13. Also, as in the modified version shown in FIG. 6 and FIG. 7, there is no problem in that a regulating means that carries out regulation with respect to the guide member 19 or the arm 18 as in the regulation plate 27, 27' is caused to function so as to press and widen the locus of movement of the connection portion 13a of the swiveling member 13 from the inside toward the outside (that is, so as to increase the swiveling radius of the connection portion 13a of the swiveling member 13).

Further, a pick-up and placement apparatus according to the invention is not limited to the examples illustrated above. It is needless to say that the apparatus may be subjected to various modifications in a range not departing from the spirit of the invention. For example, as the regulation and guiding means, it is not requisite to employ the structure to guide the vicinity portion of the connection portion, for example the connection portion 13a, the guide roller 17, or the fitting ring 25, or the driven portions such as an arm and a guide member, etc., on the side surface as in the abovementioned regulation plates. For example, a linear groove structure that regulates the driven portions at both inner sides thereof may be employed.

The entire disclosure of Japanese Patent Application No. H11-102195 (No. 102195 of 1999) filed on Apr. 6, 1999 and Japanese Patent Application No. H11-346453 (No. 346453 of 1999) filed on Dec. 6, 1999 including Specification, claims, drawings and summary are incorporated herein by references in their entirely.

What is claimed is:

1. A pick-up and placement apparatus including an arm (18) that executes pick-up and placement motions and a drive mechanism (1, 11a) that drives said arm, said drive mechanism comprising:
a rotating member (12) driven in clockwise and counter-clockwise directions in a designated range (L) less than 360° with said range (L) defining a path having opposite ends,
an elongated connecting member (13) attached to said rotating member for rotational movement therewith and slidable radially inwardly and outwardly relative to said rotating member,
said elongated connecting member having a radially located outer end (13a) mounting a pivotal connection, (17, 25) to said arm,
means (14) biasing said elongated connecting member radially relative to said rotating member,
stop means (12b, 15a) rotatable with said elongated connecting member to limit radial movement of said elongated connecting member, and
guide members (24) positioned on opposite diametric sides of said defined path and adjacent said opposite ends of said path to engage said pivotal connection of said elongated connecting member and to guide said pivotal connection in linear movement when said pivotal connection approaches said opposite ends of said defined path and to disengage from contact with said pivotal connection of said elongated connecting member when said pivotal connection is moved away from said opposite ends of said defined path with only said biasing means and said stop means determining the radial position of said pivotal connection when said pivotal connection is moving in said defined path and disengaged from said guide members,
said arm moving substantially in correspondence with said motion of said pivotal connection of said elongated connecting member.

2. A pickup and placement apparatus according to claim 1 in which said means biasing said elongated connecting member radially relative to said rotating member biases said elongated connecting member outwardly, and
said stop means limits radial movement of said elongated member outwardly.

3. A pickup and placement apparatus according to claim 1 in which said means biasing said elongated connecting member radially relative to said rotating member biases said elongated connecting member inwardly, and
said stop means limits radial movement of said elongated member inwardly.

4. A pickup and placement apparatus according to claim 1 which said guide members positioned on opposite diametric sides of said defined path are each located diametrically outwardly of said ends of said defined path.

5. A pickup and placement apparatus according to claim 1 in which said guide members positioned on opposite diametric sides of said defined path are each located diametrically inwardly of said ends of said defined path.

6. A pickup and placement apparatus according to claim 1 in which said guide members positioned on opposite diametric sides of said defined path are each located both diametrically inwardly and outwardly of said defined path, and
said stop means limits radial movement of said elongated member outwardly.

7. A pickup and placement apparatus according to claim 1 and further comprising a guide support means including a first guide to slidably guide said arm in the extending direction of said linear movement and a second guide to guide said first guide in the direction of said path connecting said linear movements.

8. A pickup and placement apparatus according to claim 1 further comprising a guiding and supporting means which guides and support said arm so that said arm always extends in the same direction from said connecting portion.

9. A pickup and placement apparatus including an arm (18) that executes pick-up and placement motions and a drive mechanism that drives said arm, said drive mechanism comprising:
  a rotating member (12) driven in clockwise and counter-clockwise directions in a designated range (L) of less than 360° with said range (L) defining a path having opposite ends,
  an elongated connecting member (13) attached to said rotating member for rotational movement therewith and slidable radially inwardly and outwardly relative to said rotating member,
  said elongated connecting member having a radially located outer end (13a) mounting a pivotal connection, (17, 25), to said arm,
  means (14') biasing said elongated member radially to an intermediate position relative to said rotating member, and
  guide members positioned on opposite diametric sides of said defined path and adjacent said opposite ends of said path to engage said pivotal connection of said elongated connecting member and to guide said pivotal connection in linear movement when said pivotal connection approaches said opposite ends of said defined path and to disengage from contact with said pivotal connection of said elongated contacting member when said pivotal connection is moved away from said opposite ends of said defined path with only said biasing means moving in said defined path and disengaged from said guide members,
  said guide members being located both diametrically inwardly and outwardly of said defined path,
  said arm moving substantially in correspondence with said motion of said pivotal connection of said elongated connecting members.

* * * * *